(12) United States Patent
Watanabe et al.

(10) Patent No.: US 11,881,943 B2
(45) Date of Patent: Jan. 23, 2024

(54) ELECTRONIC COMMUNICATION DEVICE, MAGNETIC DISK DEVICE, AND SERIAL COMMUNICATION METHOD

(71) Applicants: KABUSHIKI KAISHA TOSHIBA, Tokyo (JP); TOSHIBA ELECTRONIC DEVICES & STORAGE CORPORATION, Tokyo (JP)

(72) Inventors: Akihiro Watanabe, Kunitachi Tokyo (JP); Kenji Yoshida, Kamakura Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 338 days.

(21) Appl. No.: 17/196,547

(22) Filed: Mar. 9, 2021

(65) Prior Publication Data
US 2022/0077956 A1 Mar. 10, 2022

(30) Foreign Application Priority Data
Sep. 7, 2020 (JP) .................. 2020-149960

(51) Int. Cl.
*H04L 1/00* (2006.01)
*G06F 13/42* (2006.01)
*G11B 27/00* (2006.01)
*H04L 7/00* (2006.01)

(52) U.S. Cl.
CPC ........ *H04L 1/0045* (2013.01); *G06F 13/4282* (2013.01); *G11B 27/00* (2013.01); *H04L 7/0008* (2013.01); *G06F 2213/0028* (2013.01)

(58) Field of Classification Search
CPC ... H04L 1/0009; H04L 1/0041; H04L 1/0061; H04L 1/0071; H04L 1/0013; H04L 1/0045; G06F 13/4282; G11C 29/42; G11C 29/52
See application file for complete search history.

(56) References Cited

U.S. PATENT DOCUMENTS

| | | | |
|---|---|---|---|
| 5,661,848 A * | 8/1997 | Bonke ................ | G06F 3/0601 360/48 |
| 8,255,779 B2 | 8/2012 | Booth | |
| 8,638,823 B2 | 1/2014 | Takeuchi et al. | |
| 2017/0331592 A1 | 11/2017 | Matsushita et al. | |
| 2021/0250123 A1* | 8/2021 | Hartwich ............ | H04L 1/0041 |

FOREIGN PATENT DOCUMENTS

WO WO-2013145652 A1 * 10/2013 ........... H04L 1/0009

* cited by examiner

*Primary Examiner* — Shelly A Chase
(74) *Attorney, Agent, or Firm* — Kim & Stewart LLP

(57) ABSTRACT

According to one embodiment, an electronic communication device includes a controller that changes an upper limit value capable of correcting an error of bit data in which an error occurs in packet data transferred by serial communication.

17 Claims, 7 Drawing Sheets

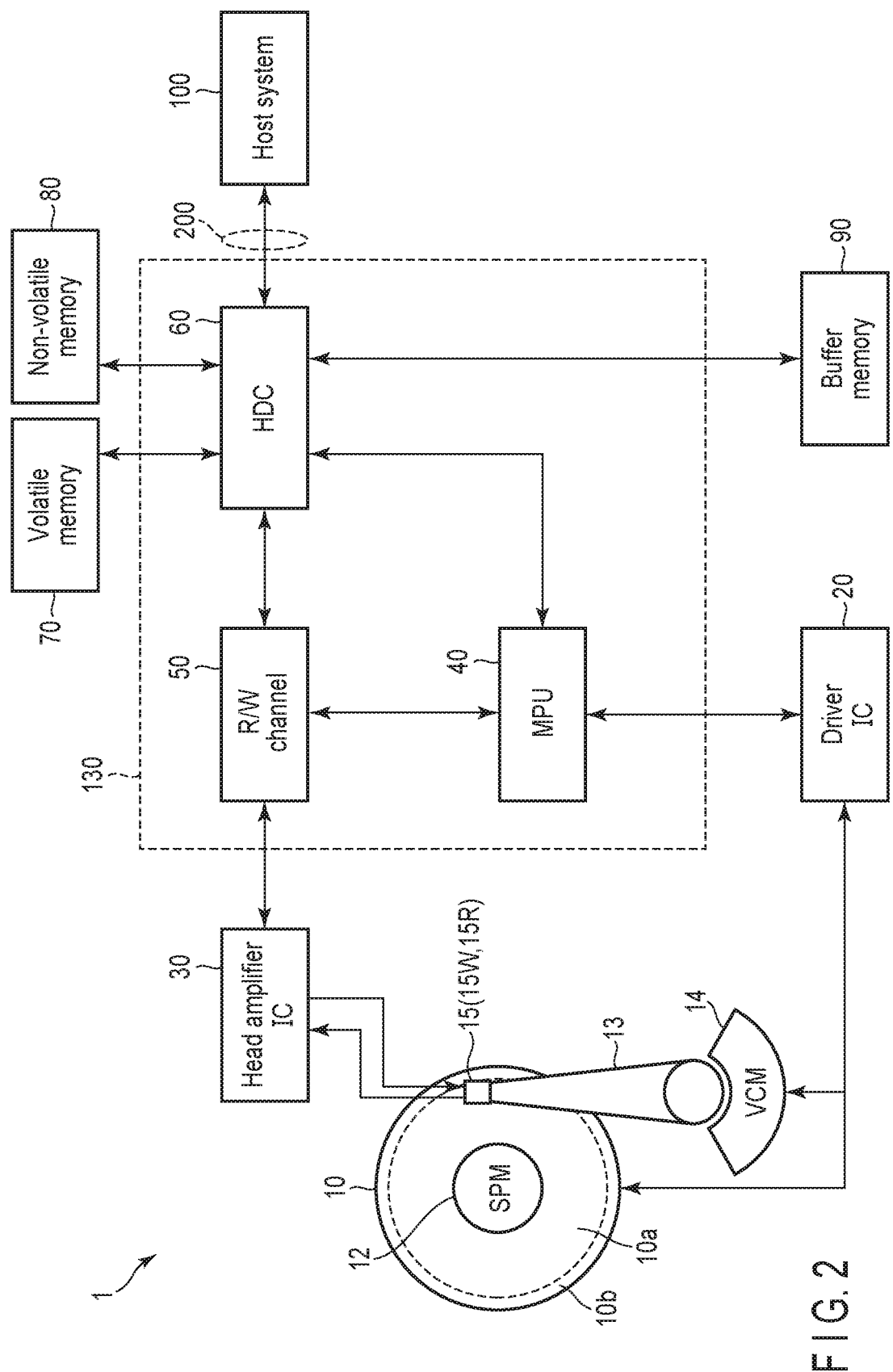
F I G. 2

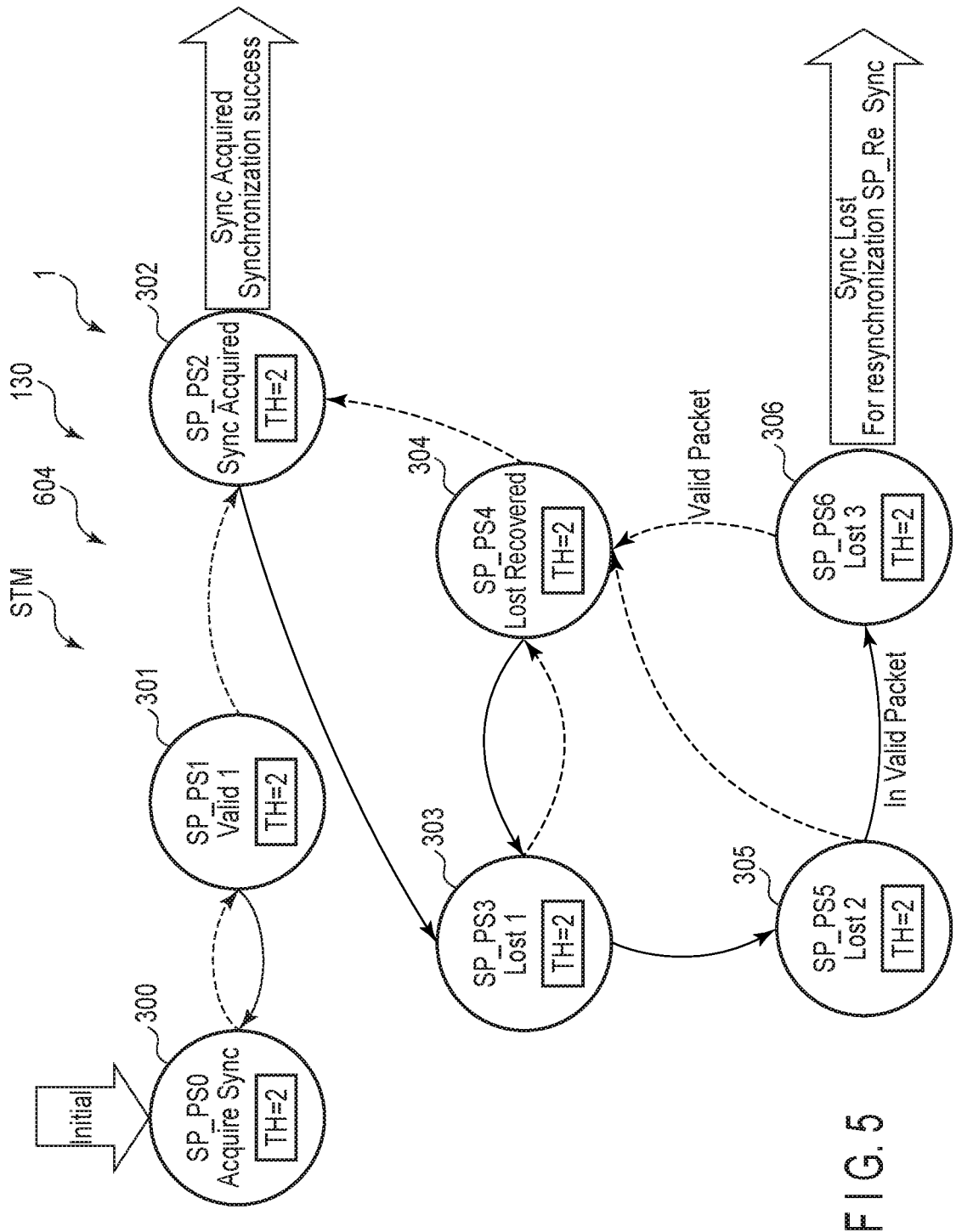
F I G. 5

ELECTRONIC COMMUNICATION DEVICE, MAGNETIC DISK DEVICE, AND SERIAL COMMUNICATION METHOD

CROSS-REFERENCE TO RELATED APPLICATION(S)

This application is based upon and claims the benefit of priority from Japanese Patent Application No. 2020-149960, filed Sep. 7, 2020, the entire contents of which are incorporated herein by reference.

FIELD

Embodiments described herein relate generally to an electronic communication device, a magnetic disk device, and a serial communication method.

BACKGROUND

In serial data communication (which may be hereinafter referred to as serial communication) with another electronic communication device, an electronic communication device needs to receive data so as to synchronize with the timing of transmitting data from the another electronic communication device. The electronic communication device can perform error correction on error date by an error correction code added by the another electronic communication device in communication that is not a retransmission method. In the serial communication with the another electronic communication device, the electronic communication device may be out of synchronization at the boundaries of packet data due to synchronization failure or the like. If the boundaries of the packet data are out of synchronization, errors may continuously occur in the packet data transferred from the another electronic communication device until the boundaries of the packet data are established or set again. In such a case, the electronic communication device may perform erroneous error correction and treat the packet data as if it is synchronized even though the boundaries of the packet data are actually out of synchronization.

BRIEF DESCRIPTION OF THE DRAWINGS

FIG. 2 is a block diagram showing a configuration of a magnetic disk device according to the embodiment.

FIG. 5 is a schematic diagram showing a configuration example of an SP_PS state machine.

DETAILED DESCRIPTION

In general, according to one embodiment, an electronic communication device comprises a controller that changes an upper limit value capable of correcting an error of bit data in which an error occurs in packet data transferred by serial communication.

Embodiments will be described below with reference to the drawings. The drawings are examples, and do not limit the scope of the invention.

Embodiment

Figure 1:
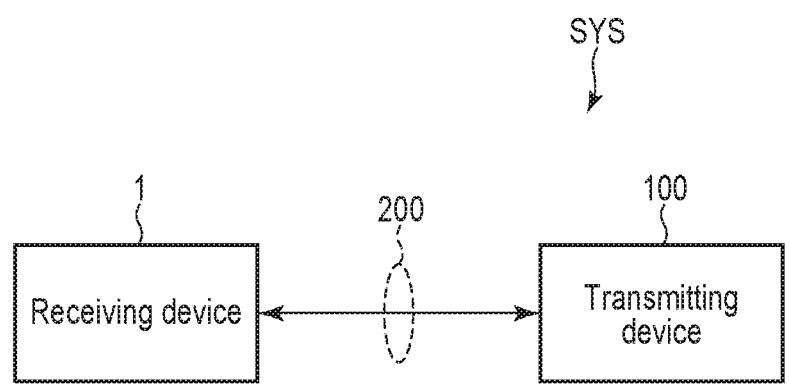
FIG. 1 is a block diagram showing a configuration example of a communication system according to an embodiment.

FIG. 1 is a block diagram showing a configuration example of a communication system SYS according to the embodiment.

The communication system SYS includes an electronic communication device (receiving device) 1 and an electronic communication device (transmitting device) 100. The receiving device 1 and the transmitting device 100 perform serial data communication (which may be hereinafter referred to as serial communication) via a transmission line 200. The transmission line 200 is a wired or wireless network. The transmission line 200 is, for example, a wiring that electrically connects the transmitting device (host) 100 and a HDC 60. Standards such as Serial Attached SCSI (SAS) (registered trademark), Serial Advanced Technology Attachment (SATA) (registered trademark), and Universal Serial Bus (USB) (registered trademark) may be applied to the transmission line 200. For example, the SAS Protocol Layer-4 (SPL-4) standard is applied to the transmission line 200. When data communication is performed at a communication rate of 22.5G called Gen5 in SPL-4, for example, an error correction code called FEC (Forward Error Correction) may be adopted. In FEC, error correction up to 2Symbol is possible. The transmitting device 100 transmits serial data to the receiving device 1 via the transmission line 200. The transmitting device 100 is, for example, a host system 100. The receiving device 1 receives the serial data transferred from the transmitting device 100 via the transmission line 200. The receiving device 1 is, for example, a recording device 1. The recording device 1 includes a magnetic disk device (Hard Disk Drive: HDD) 1 and a memory device (Solid State Drive: SSD) 1. Hereinafter, the receiving device 1 will be described as a magnetic disk device 1.

FIG. 2 is a block diagram showing a configuration of the magnetic disk device 1 according to the embodiment.

The magnetic disk device 1 includes a head disk assembly (HDA) described later, a driver IC 20, a head amplifier integrated circuit (hereinafter referred to as a head amplifier IC or a preamplifier) 30, a volatile memory 70, a nonvolatile memory 80, a buffer memory (buffer) 90, and a system controller 130 which is an integrated circuit of chips. Further, the magnetic disk device 1 is connected to the transmitting device (host system (host)) 100.

The HDA includes a magnetic disk (hereinafter referred to as a disk) 10, a spindle motor (SPM) 12, an arm 13 on which a head 15 is mounted, and a voice coil motor (VCM) 14. The disk 10 is rotated by the spindle motor 12. The arm 13 and the VCM 14 form an actuator. The actuator moves and controls the head 15 mounted on the arm 13 to a target position of the disk 10 by driving the VCM 14. The disk 10 and the head 15 may be provided in two or more numbers.

In a recording region of the disk 10, a recording region 10a that can be used by a user and a system area 10b in which information necessary for system management is written are allocated.

The head 15 includes a slider as a main body, and includes a write head 15W and a read head 15R mounted on the slider. The write head 15W writes data to the disk 10. The read head 15R reads the data recorded in a data track of the disk 10. The head 15 writes data to the disk 10 in block units including at least one sector, and reads the data in block units. Here, the sector is the smallest unit of data that is written to or read from the disk 10.

The driver IC 20 controls the drive of the SPM 12 and the VCM 14 according to the control of the system controller 130 (specifically, an MPU 40 described later).

The head amplifier IC 30 includes a read amplifier and a write driver. The read amplifier amplifies a read signal read from the disk 10 and outputs it to the system controller 130 (specifically, a read/write (R/W) channel 50 described later). The write driver outputs a write current corresponding to the write data output from the R/W channel 50 to the head 15.

The volatile memory 70 is a semiconductor memory in which stored data is lost when the power supply is cut off. The volatile memory 70 stores data and the like required for processing in each part of the magnetic disk device 1. The volatile memory 70 is, for example, DRAM (Dynamic Random Access Memory) or SDRAM (Synchronous Dynamic Random Access Memory).

The non-volatile memory 80 is a semiconductor memory that records stored data even when the power supply is cut off. The non-volatile memory 80 is, for example, a NOR type or NAND type flash ROM (Flash Read Only Memory: FROM).

The buffer memory 90 is a semiconductor memory that temporarily records data and the like transmitted and received between the magnetic disk device 1 and the transmitting device (host) 100. The buffer memory 90 may be integrally configured with the volatile memory 70. The buffer memory 90 is, for example, DRAM, SRAM (Static Random Access Memory), SDRAM, FeRAM (Ferroelectric Random Access memory), MRAM (Magnetoresistive Random Access Memory), or the like.

The system controller (controller) 130 is realized, for example, by using a large-scale integrated circuit (LSI) called System-on-a-Chip (SoC) in which a plurality of elements are integrated on a single chip. The system controller 130 includes the microprocessor (MPU) 40, the read/write (R/W) channel 50, and the hard disk controller (HDC) 60. The system controller 130 is connected to the driver IC 20, the head amplifier IC 30, the volatile memory 70, the non-volatile memory 80, the buffer memory 90, and the host system 100.

The MPU 40 is a main controller that controls each part of the magnetic disk device 1. The MPU 40 controls the VCM 14 via the driver IC 20 and performs servo control for positioning the head 15. In addition, the MPU 40 controls the operation of writing data to the disk 10 and selects a storage destination of the write data transferred from the transmitting device (host) 100. The MPU 40 performs processing based on firmware. The MPU 40 is connected to each part of the magnetic disk device 1. The MPU 40 is connected to the R/W channel 50 and the HDC 60.

The R/W channel 50 performs signal processing of read data and write data in response to an instruction from the MPU 40. Hereinafter, the read data and the write data may be simply referred to as data. The R/W channel 50 has a circuit or a function for measuring the signal quality of read data. The R/W channel 50 is connected to the head amplifier IC 30, the MPU 40, and the HDC 60.

The HDC 60 controls the data transfer between the transmitting device (host) 100 and the R/W channel 50 in response to an instruction from the MPU 40. For example, the HDC 60 temporarily stores user data transferred from the transmitting device (host) 100 in the buffer memory 90 and outputs it to the R/W channel 50. Further, the HDC 60 temporarily stores read data read from the disk 10 in the buffer memory 90 and outputs it to the transmitting device (host) 100. The HDC 60 is connected to the MPU 40, the R/W channel 50, the volatile memory 70, the non-volatile memory 80, the buffer memory 90, and the transmitting device (host) 100.

Figure 3:
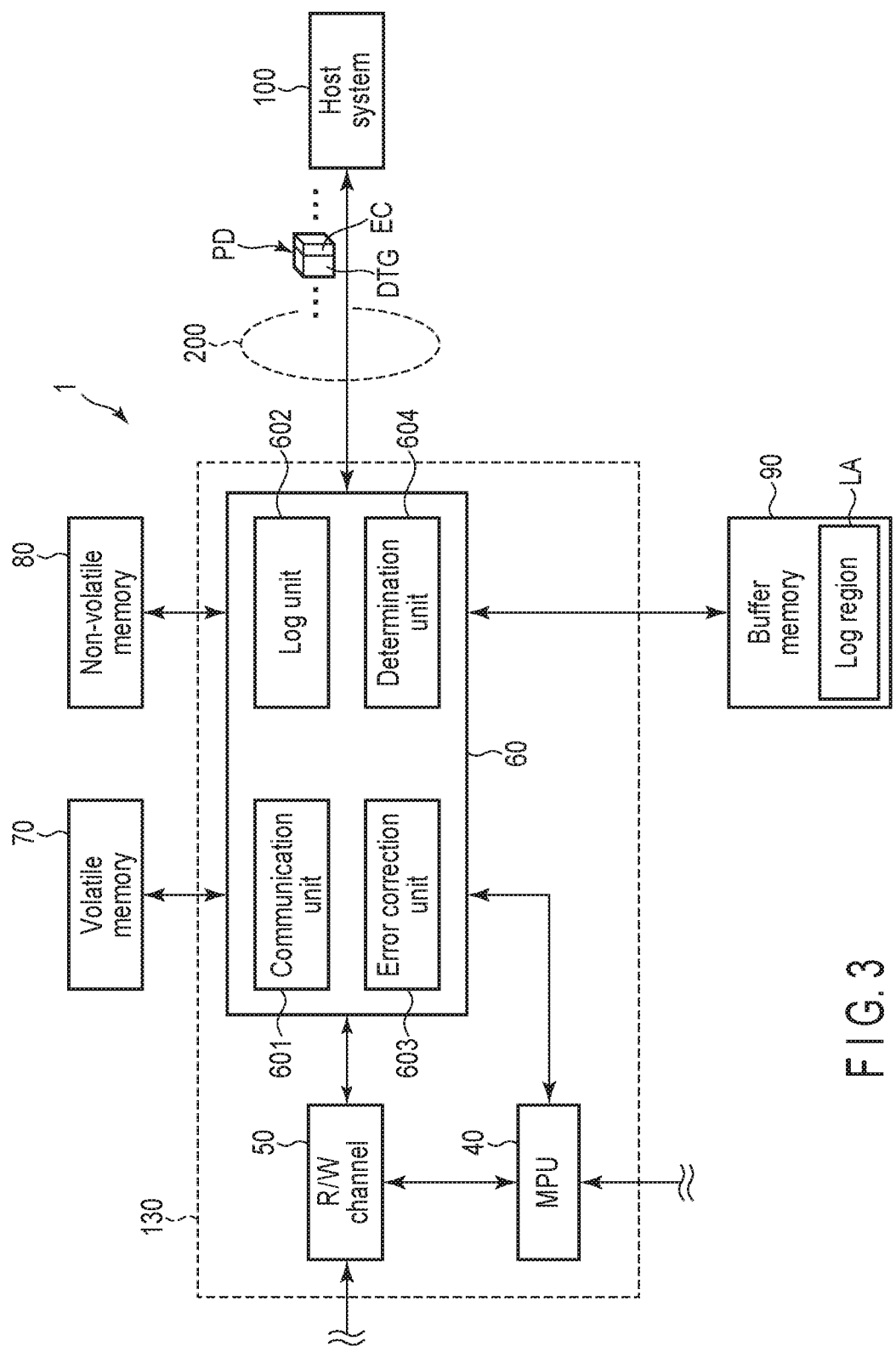
FIG. 3 is a block diagram showing a configuration example of a HDC.

FIG. 3 is a block diagram showing a configuration example of the HDC 60.

The HDC 60 includes a communication unit 601, a log unit 602, an error correction unit 603, a determination unit 604, and the like. The HDC 60 may include each of these units, for example, a communication unit 601, a log unit 602, an error correction unit 603, a determination unit 604, and the like as a circuit. Further, the HDC 60 may perform the processing of each of these units, for example, the communication unit 601, the log unit 602, the error correction unit 603, the determination unit 604, and the like on the firmware.

The communication unit 601 controls the transfer of data with the transmitting device (host) 100 by serial communication. For example, the communication unit 601 transmits/receives data to/from the transmitting device (host) 100 by serial communication that is not a retransmission method. The communication unit 601 controls the transmission/reception of data PD in packet (or frame) units (which may be hereinafter referred to as packet data) with the transmitting device (host) 100 via the transmission line 200. The packet data PD includes a particular number (or capacity), for example, a bit number of data DTG and an error correction code EC. The error correction code EC may be transferred from the transmitting device (host 100) to the HDC 60 every time a particular number of packet data PD (which may be hereinafter referred to as a packet number) is transferred as packet data different from packet data PD corresponding to user data or the like. The packet data PD may include data indicating the boundaries of the packet data (which may be hereinafter referred to as boundary data). The boundary data may be transferred from the transmitting device (host) 100 to the HDC 60 every time a particular packet number of packet data is transferred as packet data different from the packet data PD corresponding to the user data or the like and packet data corresponding to the error correction code EC. The error correction code EC includes, for example, a forward error correction code (FEC).

The log unit 602 logs (or records) error data, for example, the position (or number) of data in bit units (which may be hereinafter referred to as bit data) in which an error occurs, the number of error data, for example, the bit number, information on the content of the error (which may be hereinafter referred to as error information), and the like in a particular recording region (which may be hereinafter referred to as a log region) LA. For example, the log unit 602 logs the position (or number) of the error data in particular packet data PD, the number of error data, for example, the bit number in the particular packet data PD, the error information in the particular packet data PD, and the like in the log region LA. "Logs" includes "logs particular data" and the like. "Logs" may include "counts up the number of error data, for example, the bit number in the particular packet data PD". Hereinafter, "logging particular data in the log region LA" may be simply referred to as "log" or "log processing". In the example shown in FIG. 3, the log region LA is included in the buffer memory 90. The log region LA may be included in the volatile memory 70, the non-volatile memory 80, the log unit 602, or the like.

The error correction unit 603 performs error correction processing. The error correction unit 603 can perform error correction of a particular number or capacity (which may be hereinafter referred to as an effective threshold value) or smaller of error data in each packet data PD based on each error correction code EC corresponding to each packet data PD. For example, if the boundaries of the packet data PD transferred from the transmitting device (host) 100 are deviated due to synchronization failure or the like, the error correction unit 603 may erroneously execute error correction of the packet data PD whose boundaries are deviated. The effective threshold value corresponds to, for example, the upper limit value (or the maximum number) of error data that can be corrected by the error correction unit 603. The effective threshold value may be set to, for example, the upper limit value of error data that can be corrected based on the error correction code EC as a set initial value. The effective threshold value may be equal to or smaller than the initial value or may be smaller than the initial value. The effective threshold value may be equal to or larger than the initial value or may be larger than the initial value. For example, the effective threshold value may be set to 2Symbol as an initial value in FEC when data communication is performed at a communication rate of 22.5G called Gen5 in SPL-4. The effective threshold value may be equal to or smaller than 2Symbol or may be smaller than 2Symbol. Further, the effective threshold value may be equal to or larger than 2Symbol or may be larger than 2Symbol.

The determination unit 604 establishes (sets or confirms) the boundaries of the packet data PD transferred from the transmitting device (host) 100 to the HDC 60. The determination unit 604 synchronizes the boundaries of the packet data PD or takes synchronization of the boundaries of the packet data PD. The determination unit 604 may establish (set or confirm) the boundaries of the packet data PD transferred from the transmitting device (host) 100 based on the boundary data.

The determination unit 604 detects error data for each packet data PD transferred from the transmitting device (host) 100, for example, bit data in which an error has occurred, and counts the error data for each packet data PD.

The determination unit 604 determines, for each packet data PD, whether it is packet data PD containing no error data or containing a small amount of error data (which may be hereinafter referred to as valid packet data) or packet data PD containing uncorrectable error data (which may be hereinafter referred to as invalid packet data). For example, the determination unit 604 determines whether the packet data PD is valid packet data or invalid packet data based on the number of error data, for example, the bit number in each packet data PD.

In an example, the determination unit 604 determines that the packet data PD is valid packet data PD when there is no error data in the particular packet data PD or when error data equal to or smaller than the effective threshold value is detected in the particular packet data PD.

In an example, when the determination unit 604 detects more error data than the effective threshold value in the particular packet data PD, the determination unit 604 determines the packet data PD is invalid packet data PD.

When valid packet data is continuous, the determination unit 604 may determine that the boundaries of the packet data PD transferred from the transmitting device (host) 100 are synchronized and that the boundaries of the packet data PD are not deviated. For example, when the determination unit 604 determines that a plurality of consecutive pieces of packet data PD are valid packet data, the determination unit 604 determines that the boundaries of the packet data PD transferred from the transmitting device (host) 100 are not deviated. When invalid packet data is continuous, the determination unit 604 may determine that the boundaries of the packet data PD transferred from the transmitting device (host) 100 are deviated due to synchronization failure or the like. For example, when the determination unit 604 determines that the plurality of consecutive pieces of packet data PD are invalid packet data, the determination unit 604 determines that the boundaries of the packet data PD transferred from the transmitting device (host) 100 are deviated.

When the determination unit 604 determines that the boundaries of the packet data PD are not deviated, that is, the boundaries of the packet data PD have been successfully synchronized, the determination unit 604 sets the boundaries of the packet data PD, and, for example, transitions to the state of performing communication with the transmitting device (host) 100.

When the determination unit 604 determines that the boundaries of the packet data PD are deviated, that is, the boundaries of the packet data PD have been failed to be synchronized, the determination unit 604 transitions to the state of synchronizing the boundaries of the packet data PD. In other words, when the determination unit 604 determines that the boundaries of the packet data PD are deviated, the determination unit 604 temporarily stops the communication and sets again (establishes or sets again) the boundaries of the packet data PD.

For example, when erroneous error correction is performed on packet data PD whose boundaries are not synchronized and are deviated, that is, invalid packet data PD, the determination unit 604 may determine that the invalid packet data PD having been subjected to the erroneous error correction is valid packet data PD, and may determine that the boundaries of the packet data PD are synchronized and transition to the state of performing communication with the transmitting device (host) 100. When the determination unit 604 erroneously determines that the invalid packet data PD having been subjected to the erroneous error correction is valid packet data P as described above, the determination unit 604 may take a long time to transition to the state of synchronizing again (establishing or setting again) the boundaries of the invalid packet data PD having been subjected to the erroneous error correction.

The determination unit 604 includes, for example, a phy layer SPL packet synchronization (SP_PS) state machine. The determination unit 604 may perform the synchronization of the boundaries of the packet data PD by handling using an SP_PS state machine in SPL-4 used in HDD I/F. The SP_PS state machine includes states, such as SP_PS0: AcquireSync, SP_PS1: Valid1, SP_PS2: SyncAcquired, SP_PS3: Lost1, SP_PS4: LostRecovered, SP_PS5: Lost2, and SP_PS6: Lost3. For example, when the SP_PS state machine receives, under the state of SP_PS1: Valid1, valid packet data, invalid packet data, invalid packet data, valid packet data, invalid packet data, valid packet data, and valid packet date in the stated order, the SP_PS state machine may transition to SP_PS2: SyncAcquired, SP_PS3: Lost1, SP_PS5: Lost2, SP_PS4: LostRecovered, SP_PS3: Lost1, SP_PS4: LostRecovered, and SP_PS2: SyncAcquired in the stated order.

The determination unit 604 determines whether the communication quality is normal or not. The determination unit 604 determines whether the communication quality is normal or not based on the number of error data in each packet data PD. For example, when the determination unit 604 determines that the number of error data in the particular packet data PD is equal to or smaller than the effective threshold value, that is, when the determination unit 604 determines that the particular packet data PD is valid packet data PD, the determination unit 604 may determine that the communication quality of the packet data PD is normal. When the determination unit 604 determines that the number of error data in the particular packet data PD is larger than the effective threshold value, that is, when the determination unit 604 determines that the particular packet data PD is invalid packet data PD, the determination unit 604 may determine that the communication quality of the packet data PD is not normal.

The determination unit 604 sets or changes the effective threshold value. The determination unit 604 optionally changes the effective threshold value according to the communication state with the transmitting device (host) 100, the signal state of the packet data PD, or the established state of synchronization of the boundaries of the packet data PD. The determination unit 604 sets the effective threshold value to be smaller in order to shorten the time to transition to the state of synchronizing again (establishing or setting again) the boundaries of the packet data PD according to the communication state with the transmitting device (host) 100, the signal state of the packet data PD, or the established state of synchronization of the boundaries of the packet data PD. For example, the determination unit 604 sets the effective threshold value to be smaller than the initial value according to the communication state with the transmitting device (host) 100, the signal state of the packet data PD, or the established state of synchronization of the boundaries of the packet data PD. The determination unit 604 sets the effective threshold value to be equal to or smaller than the initial value in order to shorten the time to transition to the state of synchronizing again (establishing or setting again) the boundaries of the packet data PD according to the communication state with the transmitting device (host) 100, the signal state of the packet data PD, or the established state of synchronization of the boundaries of the packet data PD. For example, the determination unit 604 sets the effective threshold value to be equal to or smaller than the initial value according to the communication state with the transmitting device (host) 100, the signal state of the packet data PD, or the established state of synchronization of the boundaries of the packet data PD. The determination unit 604 may set the effective threshold value to be larger than the initial value according to the communication state with the transmitting device 100, the signal state of the packet data PD, or the established state of synchronization of the boundaries of the packet data PD.

For example, the determination unit 604 changes the effective threshold value in each state of the SP_PS state machine according to the communication state with the transmitting device 100, the signal state of the packet data PD, or the established state of synchronization of the boundaries of the packet data PD. Further, for example, the determination unit 604 changes the effective threshold value in some states of the SP_PS state machine according to the communication state with the transmitting device 100, the signal state of the packet data PD, or the established state of synchronization of the boundaries of the packet data PD.

The determination unit 604 may set the effective threshold value to be smaller in each state of the SP_PS state machine or may set the effective threshold value to be smaller in some states of the SP_PS state machine according to the communication state with the transmitting device 100, the signal state of the packet data PD, or the established state of synchronization of the boundaries of the packet data PD.

The determination unit 604 may set the effective threshold value to be smaller than the initial value in each state of the SP_PS state machine or may set the effective threshold value to be smaller than the initial value in some states of the SP_PS state machine according to the communication state with the transmitting device 100, the signal state of the packet data PD, or the established state of synchronization of the boundaries of the packet data PD. The determination unit 604 may set the effective threshold value to be smaller than the initial value in each state of the SP_PS state machine or may set the effective threshold value to be smaller than the initial value in some states of the SP_PS state machine according to the communication state with the transmitting device 100, the signal state of the packet data PD, or the established state of synchronization of the boundaries of the packet data PD. The determination unit 604 may set the effective threshold value to be equal to or smaller than the initial value in each state of the SP_PS state machine or may set the effective threshold value to be equal to or smaller than the initial value in some states of the SP_PS state machine according to the communication state with the transmitting device 100, the signal state of the packet data PD, or the established state of synchronization of the boundaries of the packet data PD.

The determination unit 604 sets the effective threshold value to be smaller in each state of the SP_PS state machine when the signal state of the packet data PD (communication state with the transmitting device 100 or the established state of synchronization of the boundaries of the packet data PD) is not good, for example, the boundaries of the packet data PD are not synchronized and communication with the transmitting device (host) 100 is not performed, and the determination unit 604 does not transition to the state of synchronizing again the boundaries of the packet data PD. For example, the determination unit 604 sets the effective threshold value to be smaller than the initial value in each state of the SP_PS state machine when the boundaries of the packet data PD are not synchronized and communication with the transmitting device (host) 100 is not performed, and the determination unit 604 does not transition to the state of synchronizing again the boundaries of the packet data PD.

The determination unit 604 sets the effective threshold value to be smaller in each state of the SP_PS state machine when the signal state of the packet data PD (communication state with the transmitting device 100 or the established state of synchronization of the boundaries of the packet data PD) is not good, for example, the boundaries of the packet data PD are not synchronized and communication with the transmitting device (host) 100 is not performed. The determination unit 604 sets the effective threshold value to be smaller than the initial value in each state of the SP_PS state machine when the boundaries of the packet data PD are not synchronized and communication with the transmitting device (host) 100 is not performed.

The determination unit 604 sets the effective threshold value to be smaller in each state of the SP_PS state machine when the signal state of the packet data PD (communication state with the transmitting device 100 or the established state of synchronization of the boundaries of the packet data PD) is not good, for example, the determination unit 604 does not transition to the state of synchronizing again the boundaries of the packet data PD. The determination unit 604 sets the effective threshold value to be smaller than the initial value in each state of the SP_PS state machine when the determination unit 604 does not transition to the state of synchronizing again the boundaries of the packet data PD.

The determination unit 604 may set the effective threshold value to be larger in each state of the SP_PS state machine or may set the effective threshold value to be larger in some states of the SP_PS state machine according to the communication state with the transmitting device 100, the signal state of the packet data PD, or the established state of synchronization of the boundaries of the packet data PD. Further, the determination unit 604 may set the effective threshold value to be larger than the initial value in each state of the SP_PS state machine or may set the effective threshold value to be larger than the initial value in some states of the SP_PS state machine according to the communication state with the transmitting device 100, the signal state of the packet data PD, or the established state of synchronization of the boundaries of the packet data PD. The determination unit 604 may set the effective threshold value to be larger in each state of the SP_PS state machine and may set the effective threshold value to be larger in some states of the SP_PS state machine when the signal state of the packet data PD (communication state with the transmitting device 100 or the established state of synchronization of the boundaries of the packet data PD) is good. The determination unit 604 may set the effective threshold value to be larger than the initial value in each state of the SP_PS state machine and may set the effective threshold value to be larger than the initial value in some states of the SP_PS state machine when the signal state of the packet data PD (communication state with the transmitting device 100 or the established state of synchronization of the boundaries of the packet data PD) is good. The determination unit 604 may maintain (not change) the effective threshold value in each state of the SP_PS state machine and may maintain (not change) the effective threshold value in some states of the SP_PS state machine when the signal state of the packet data PD (communication state with the transmitting device 100 or the established state of synchronization of the boundaries of the packet data PD) is good.

Figure 4:
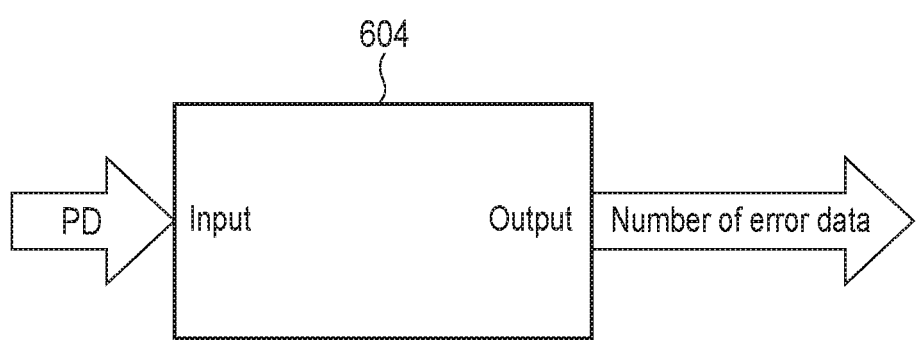
FIG. 4 is a schematic diagram showing a configuration example of a determination unit according to the embodiment.

FIG. 4 is a schematic diagram showing a configuration example of the determination unit 604 according to the present embodiment.

In the example shown in FIG. 4, when the packet data PD is input, the determination unit 604 detects error data in the packet data PD and outputs the number of the detected error data. When the packet data PD is input in each state of the SP_PS state machine, the determination unit 604 detects the error data in the packet data PD and outputs the number of the detected error data. When the number of error data is equal to or smaller than the effective threshold value, the determination unit 604 determines that the packet data PD is valid packet data PD whose boundaries are synchronized. When the number of error data is equal to or smaller than the effective threshold value in each state of the SP_PS state machine, the determination unit 604 determines that the packet data PD is valid packet data PD whose boundaries are synchronized. When the number of error data is larger than the effective threshold value, the determination unit 604 determines that the packet data PD is invalid packet data PD whose boundaries are not synchronized. When the number of error data is larger than the effective threshold value in each state of the SP_PS state machine, the determination unit 604 determines that the packet data PD is invalid packet data PD whose boundaries are not synchronized.

FIG. 5 is a schematic diagram showing a configuration example of an SP_PS state machine STM. In FIG. 5, the SP_PS state machine STM includes a state (SP_PS0 AcquireSync) 300, a state (SP_PS1 Valid1) 301, a state (SP_PS2 SyncAcquired) 302, a state (SP_PS3 Lost1) 303, a state (SP_PS4 LostRecovered) 304, a state (SP_PS5 Lost2) 305, and a state (SP_PS6 Lost3) 306. In FIG. 5, in the SP_PS state machine STM, an effective threshold value TH=2 (Symbol) is set as an initial value in each state. That is, in FIG. 5, the SP_PS state machine STM can perform error correction of error data up to 2 (Symbol) in each state, for example, the states 301 to 306. In FIG. 5, the broken lines indicate the transition directions when the SP_PS state machine STM determines that the packet data PD is valid packet data PD, and the solid lines indicate the transition directions when the SP_PS state machine STM determines that the packet data PD is invalid packet data PD.

In the example shown in FIG. 5, when the SP_PS state machine STM determines that the packet data PD is valid packet data PD and the boundaries of the packet data PD are synchronized, and performs communication with the transmitting device (host) 100, the SP_PS state machine STM is in the state (SP_PS2: SyncAcquired) 302 in which the boundaries of the packet data PD are synchronized and communication with the transmitting device (host) 100 is performed.

When the SP_PS state machine STM determines in the state 302 that the packet data PD is invalid packet data PD and the boundaries of the packet data PD are not synchronized, the SP_PS state machine STM transitions to the state (SP_PS3: Lost1) in which the packet data PD is not synchronized. When the determination that the packet data PD is invalid packet data PD and the boundaries of the packet data PD are not synchronized is made four times in a row, the SP_PS state machine STM transitions to the state (SP_PS0: AcquireSync) 300 for synchronizing again (establishing or setting again) the boundaries of the packet data PD. For example, when the determination that the packet data PD is invalid packet data PD and the boundaries of the packet data PD are not synchronized is made four times in a row in the state 302, the SP_PS state machine STM transitions to the state (SP_PS3: Lost1) 303, the state (SP_PS5: Lost2) 305, and the state (SP_PS6: Lost3) 306 in which the packet data PD is not synchronized in the stated order, and transitions to the state 300. When the SP_PS state machine STM determines in the state 303 that the packet data PD is invalid packet data PD and the boundaries of the packet data PD are not synchronized, the SP_PS state machine STM transitions to the state 305. When the SP_PS state machine STM determines in the state 305 that the packet data PD is invalid packet data PD because the signal quality is not good and the boundaries of the packet data PD are not synchronized, the SP_PS state machine STM transitions to the state 306.

When the SP_PS state machine STM performs erroneous error correction and erroneously determines in state 305 that the boundaries of the invalid packet data PD are synchronized, the SP_PS state machine STM may transition to the state (SP_PS4: LostRecovered) 304. After the SP_PS state machine STM makes the erroneous determination and transitions to the state 304, when the SP_PS state machine STM determines in the state 304 that the boundaries of the packet data PD are synchronized, the SP_PS state machine STM may transition to the state 302. When the SP_PS state machine STM makes the erroneous determination and transitions to the state 304 and the state 302, the SP_PS state machine STM takes a long time to determine that the packet data PD is invalid packet data PD and the packet data PD is not synchronized, transition to the states 303, 305, and 306, and transition to the state 300 for synchronizing again (establishing or setting again) the boundaries of the packet data PD. In FEC adopted in SPL of SAS protocol, if bit shift occurs and the input bit string becomes a data pattern different from the boundaries of the packet data PD, erroneous error correction occurs with a probability of about 40%. Therefore, it may take a long time to transition to the state 300 for synchronizing again (establishing or setting again) the boundaries of the packet data PD as described above. Therefore, by setting the effective threshold value to be smaller and making it easier to determine that the boundaries of the packet data PD are not synchronized, the time to transition to the state 300 for synchronizing again (establishing or setting again) the boundaries of the packet data PD can be shortened. Further, the probability of erroneous error correction can also be reduced by setting the effective threshold value to be smaller and making it easier to determine that the boundaries of the packet data PD are not synchronized.

Figure 6:
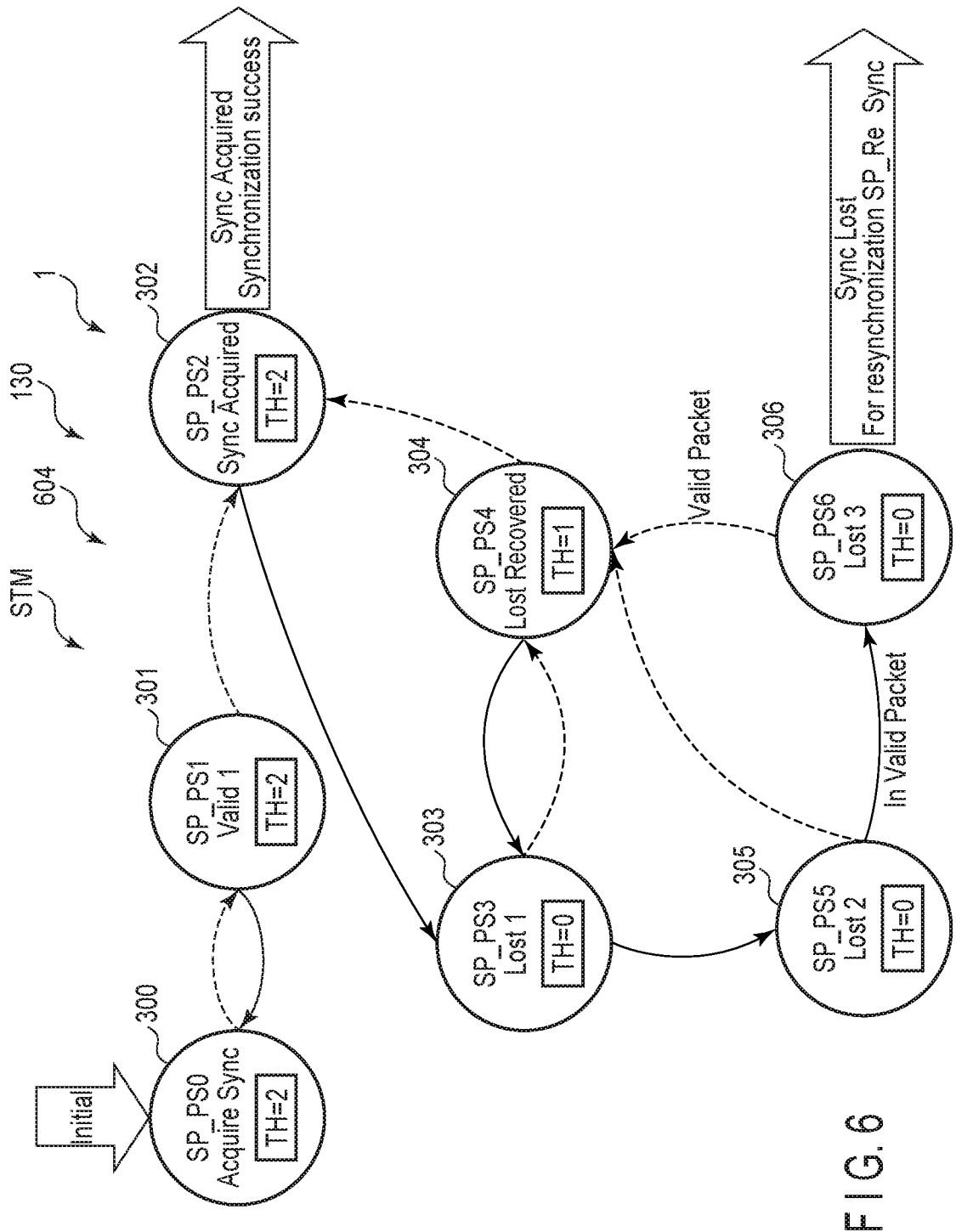
FIG. 6 is a schematic diagram showing a configuration example of the SP_PS state machine according to the embodiment.

FIG. 6 is a schematic diagram showing a configuration example of the SP_PS state machine STM according to the present embodiment. FIG. 6 corresponds to a part of FIG. 5. In FIG. 6, the SP_PS state machine STM sets an effective threshold value TH=2 (Symbol) as an initial value in each state.

In the example shown in FIG. 6, the SP_PS state machine STM changes the effective threshold value TH from 2Symbol to 0Symbol in the state 303 according to the communication state with the transmitting device (host) 100, the signal state of the packet data PD, or the established state of synchronization of the boundaries of the packet data PD. For example, the SP_PS state machine STM changes the effective threshold value TH from 2Symbol to 0Symbol in the state 303 when the signal state of the packet data PD (communication state with the transmitting device (host) 100 or the established state of synchronization of the boundaries of the packet data PD) is not good. If the SP_PS state machine STM changes the effective threshold value TH from 2Symbol to 0Symbol in the state 303, when the number of error data in the packet data PD is 2Symbol, the SP_PS state machine STM determines that the packet data PD is invalid packet data PD and the boundaries of the packet data PD are not synchronized, and transitions to the state 305.

The SP_PS state machine STM changes the effective threshold value TH from 2Symbol to 1Symbol in the state 304 according to the communication state with the transmitting device (host) 100, the signal state of the packet data PD, or the established state of synchronization of the boundaries of the packet data PD. For example, the SP_PS state machine STM changes the effective threshold value TH from 2Symbol to 1Symbol in the state 304 when the signal state of the packet data PD (communication state with the transmitting device (host) 100 or the established state of synchronization of the boundaries of the packet data PD) is not good. If the SP_PS state machine STM changes the effective threshold value TH from 2Symbol to 1Symbol in the state 304, when the number of error data in the packet data PD is 2Symbol, the SP_PS state machine STM determines that the packet data PD is invalid packet data PD and the boundaries of the packet data PD are not synchronized, and transitions to the state 303.

The SP_PS state machine STM changes the effective threshold value TH from 2Symbol to 0Symbol in the state 305 according to the communication state with the transmitting device (host) 100, the signal state of the packet data PD, or the established state of synchronization of the boundaries of the packet data PD. For example, the SP_PS state machine STM changes the effective threshold value TH from 2Symbol to 0Symbol in the state 305 when the signal state of the packet data PD (communication state with the transmitting device (host) 100 or the established state of synchronization of the boundaries of the packet data PD) is not good. If the SP_PS state machine STM changes the effective threshold value TH from 2Symbol to 0Symbol in the state 305, when the number of error data in the packet data PD is 2Symbol, the SP_PS state machine STM determines that the packet data PD is invalid packet data PD and the boundaries of the packet data PD are not synchronized, and transitions to the state 306.

The SP_PS state machine STM changes the effective threshold value TH from 2Symbol to 0Symbol in the state 306 according to the communication state with the transmitting device (host) 100, the signal state of the packet data PD, or the established state of synchronization of the boundaries of the packet data PD. For example, the SP_PS state machine STM changes the effective threshold value TH from 2Symbol to 0Symbol in the state 306 when the signal state of the packet data PD (communication state with the transmitting device (host) 100 or the established state of synchronization of the boundaries of the packet data PD) is not good. If the SP_PS state machine STM changes the effective threshold value TH from 2Symbol to 0Symbol in the state 306, when the number of error data in the packet data PD is 2Symbol, the SP_PS state machine STM determines that the packet data PD is invalid packet data PD and the boundaries of the packet data PD are not synchronized, transitions to the state (Sync Lost: SP_ReSync) in order to synchronize again the boundaries of the packet data PD, and transitions to the state (SP_PS0: AcquireSync) 300.

Figure 7:
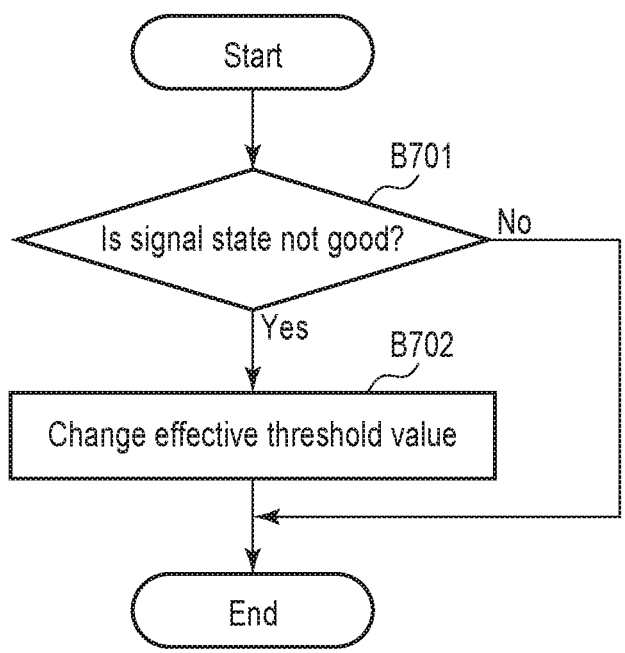
FIG. 7 is a flowchart showing an example of a serial communication method according to the embodiment.

FIG. 7 is a flowchart showing an example of a serial communication method according to the present embodiment.

The system controller 130 determines whether the signal state of the packet data PD (communication state with the transmitting device (host) 100 or the established state of synchronization of the boundaries of the packet data PD) is good or not (B701). When the system controller 130 determines that the signal state of the packet data PD (communication state with the transmitting device (host) 100 or the established state of synchronization of the boundaries of the packet data PD) is good (NO of B701), the system controller 130 ends the processing. For example, when the system controller 130 determines that the communication with the transmitting device (host) 100 is being performed or determines to transition to the state of synchronizing again (establishing or setting again) the boundaries of the packet data PD transferred from the transmitting device (host) 100 without requiring a time, the system controller 130 determines that the signal state of the packet data PD (communication state with the transmitting device (host) 100 or the established state of synchronization of the boundaries of the packet data PD) is good, and ends the processing. When the system controller 130 determines that the signal state of the packet data PD (communication state with the transmitting device (host) 100 or the established state of synchronization of the boundaries of the packet data PD) is not good (YES of B701), the system controller 130 changes the effective threshold value (B702), and ends the processing. For example, when the system controller 130 determines that the communication with the transmitting device (host) 100 is not being performed or determines that it takes a time to transition to the state of synchronizing again the boundaries of the packet data PD transferred from the transmitting device (host) 100, the system controller 130 determines that the signal state of the packet data PD (communication state with the transmitting device (host) 100 or the established state of synchronization of the boundaries of the packet data PD) is not good, sets the effective threshold value to be smaller than the initial value, and ends the processing.

According to the present embodiment, the electronic communication device (magnetic disk device) 1 includes the SP_PS state machine STM. The electronic communication device 1 changes the effective threshold value in each state of the SP_PS state machine STM according to the communication state with the transmitting device (host) 100, the signal state of the packet data PD, or the established state of synchronization of the boundaries of the packet data PD. When the electronic communication device 1 determines that the signal state of the packet data PD (communication state with the transmitting device (host) 100 or the established state of synchronization of the boundaries of the packet data PD) is not good, in each state, the electronic communication device 1 sets the effective threshold value to be smaller. For example, when the electronic communication device 1 determines that the signal state of the packet data PD (communication state with the transmitting device (host) 100 or the established state of synchronization of the boundaries of the packet data PD) is not good, in each state, the electronic communication device 1 sets the effective threshold value to be smaller than the initial value. The electronic communication device 1 can shorten the time to transition to the state of synchronizing again the boundaries of the packet data PD by setting the effective threshold value to be smaller according to the communication state with the transmitting device (host) 100, the signal state of the packet data PD, or the established state of synchronization of the boundaries of the packet data PD. Further, the electronic communication device 1 can reduce the probability of performing erroneous error correction by setting the effective threshold value to be smaller according to the communication state with the transmitting device (host) 100, the signal state of the packet data PD, or the established state of synchronization of the boundaries of the packet data PD. Therefore, the electronic communication device 1 can improve the reliability.

Examples of the magnetic disk device and the information management method obtained from the configuration disclosed in the present specification are added below.

(1) An electronic communication device comprising a controller that changes an upper limit value capable of correcting an error of bit data in which an error occurs in packet data transferred by serial communication.

(2) The electronic communication device according to (1), wherein the controller changes the upper limit value according to a signal state of the packet data.

(3) The electronic communication device according to (2), wherein the controller sets the upper limit value to be smaller when the signal state is not good.

(4) The electronic communication device according to (3), wherein the controller sets the upper limit value to be smaller when boundaries of the packet data cannot be synchronized and the controller does not transition to a state of synchronizing the boundaries of the packet data.

(5) The electronic communication device according to (1), wherein the controller includes a state machine that transitions to a state of synchronizing boundaries of the packet data when the upper limit value is exceeded four times in a row, and the controller changes the upper limit value according to a signal state of the packet data in each state of the state machine.

(6) The electronic communication device according to (5), wherein the controller sets the upper limit value to be smaller when the signal state of the packet data is not good in each state.

(7) A magnetic disk device comprising: a disk; a head that writes data to the disk and reads data from the disk; and a controller that changes an upper limit value capable of correcting an error of bit data in which an error occurs in packet data transferred by serial communication.

(8) The magnetic disk device according to (7), wherein the controller includes a state machine corresponding to SAS Protocol Layer-4, and the controller changes the upper limit value according to a signal state of the packet data in each state of the state machine.

(9) The magnetic disk device according to (8), wherein the controller sets the upper limit value to be smaller when the signal state of the packet data is not good in each state.

(10) A serial communication method applied to an electronic communication device, comprising changing an upper limit value capable of correcting an error of bit data in which an error occurs in packet data transferred by serial communication.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic communication device comprising a controller that changes an upper limit value capable of correcting an error of bit data in which an error occurs in packet data transferred by serial communication
according to a signal state of the packet data.

2. The electronic communication device according to claim 1, wherein the controller sets the upper limit value to be smaller when the signal state is not good.

3. The electronic communication device according to claim 2, wherein the controller sets the upper limit value to be smaller when boundaries of the packet data cannot be synchronized and the controller does not transition to a state of synchronizing the boundaries of the packet data.

4. An electronic communication device comprising a controller that changes an upper limit value capable of correcting an error of bit data in which an error occurs in packet data transferred by serial communication,
wherein the controller includes a state machine that transitions to a state of synchronizing boundaries of the packet data when the upper limit value is exceeded four times in a row, and the controller changes the upper limit value according to a signal state of the packet data in each state of the state machine.

5. The electronic communication device according to claim 4, wherein the controller sets the upper limit value to be smaller when the signal state of the packet data is not good in each state.

6. The electronic communication device according to claim 5, wherein the state machine corresponds to SAS Protocol Layer-4.

7. The electronic communication device according to claim 6, wherein the state machine is an SP_PS state machine.

8. The electronic communication device according to claim 7, wherein the state machine transitions to SP_PS0: AcquireSync when the upper limit value is exceeded four times in a row.

9. A magnetic disk device comprising:
a disk;
a head that writes data to the disk and reads data from the disk; and
a controller that changes an upper limit value capable of correcting an error of bit data in which an error occurs in packet data transferred by serial communication,
wherein the controller includes a state machine corresponding to SAS Protocol Layer-4, and the controller changes the upper limit value according to a signal state of the packet data in each state of the state machine.

10. The magnetic disk device according to claim 9, wherein the controller sets the upper limit value to be smaller when the signal state of the packet data is not good in each state.

11. A serial communication method applied to an electronic communication device, comprising changing an upper limit value capable of correcting an error of bit data in which an error occurs in packet data transferred by serial communication according to a signal state of the packet data.

12. The serial communication method according to claim 11, further comprising setting the upper limit value to be smaller when the signal state is not good.

13. The serial communication method according to claim 12, further comprising setting the upper limit value to be smaller when boundaries of the packet data cannot be synchronized and transition to a state of synchronizing the boundaries of the packet data is not achieved.

14. A serial communication method applied to an electronic communication device, comprising changing an upper limit value capable of correcting an error of bit data in which an error occurs in packet data transferred by serial communication,
wherein a state machine that transitions to a state of synchronizing boundaries of the packet data when the upper limit value is exceeded four times in a row is provided, and the serial communication method further comprises changing the upper limit value according to a signal state of the packet data in each state of the state machine.

15. The serial communication method according to claim 14, further comprising setting the upper limit value to be smaller when the signal state of the packet data is not good in each state.

16. The serial communication method according to claim 15, wherein the state machine corresponds to SAS Protocol Layer-4.

17. The serial communication method according to claim 16, wherein the state machine is an SP_PS state machine.

* * * * *